US008413192B2

(12) United States Patent  
Kato et al.

(10) Patent No.: US 8,413,192 B2  
(45) Date of Patent: Apr. 2, 2013

(54) VIDEO CONTENT VIEWING APPARATUS

(75) Inventors: Masahiro Kato, Tokyo (JP); Jyunichi Kimura, Koganei (JP); Minako Toba, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 544 days.

(21) Appl. No.: 12/253,475

(22) Filed: Oct. 17, 2008

(65) Prior Publication Data

US 2009/0112933 A1    Apr. 30, 2009

(30) Foreign Application Priority Data

Oct. 24, 2007    (JP) ................................ 2007-276346

(51) Int. Cl.  
*G06F 3/00* (2006.01)  
*G06F 13/00* (2006.01)  
*H04N 5/445* (2011.01)

(52) U.S. Cl. ................ 725/47; 725/37; 725/43; 725/53; 707/706; 707/708

(58) Field of Classification Search ............... 725/37, 725/45–46, 53, 58, 87, 91, 100, 134, 141, 725/143, 145, 146; 715/723–726, 730–732, 715/753; 386/95, 126; 382/305–306; 707/706–708, 707/736, 769, 771, 780, 802–805  
See application file for complete search history.

(56) References Cited

U.S. PATENT DOCUMENTS

| | | | |
|---|---|---|---|
| 6,799,180 B1 | 9/2004 | McGrath et al. | |
| 7,848,598 B2 * | 12/2010 | Nagatani et al. | ............... 382/305 |
| 2005/0182792 A1 * | 8/2005 | Israel et al. | ................ 707/104.1 |
| 2007/0288505 A1 | 12/2007 | Kato et al. | |

FOREIGN PATENT DOCUMENTS

| | | |
|---|---|---|
| JP | 2001-155036 A | 6/2001 |
| JP | 2002-152692 | 5/2002 |
| JP | 2003-158726 | 5/2003 |
| JP | 2004-112379 A | 4/2004 |
| JP | 2006-165650 | 2/2006 |
| JP | 2007-524160 A | 8/2007 |

* cited by examiner

Primary Examiner — Hai V Tran  
(74) Attorney, Agent, or Firm — Mattingly & Malur, PC

(57) ABSTRACT

A multifunction video navigation display is achieved without adding an extra load onto hardware or software of a viewing apparatus. In such a video content viewing apparatus, a memory unit acquires video contents and metadata to execute video navigation functions from an external server and stores them, a metadata analysis unit verifies completeness of the acquired metadata and corrects/complements an incomplete portion of the metadata, and a navigation unit executes the selected video navigation function according to an analysis result provided from the metadata analysis unit.

12 Claims, 13 Drawing Sheets

FIG.5

| LOCATION OF METADATA AND OTHER VIDEO CONTENTS ||| 
|---|---|---|
| AT HOME | VIDEO CAMERA ||
| | HARD DISK DRIVE BUILT IN TERMINAL ||
| | OPTICAL DISK, VIDEO TAPE, REMOVABLE DISK ||
| | HOME NETWORK CONNECTION APPARATUS ||
| OUTSIDE HOME | BROADCASTING (DIGITAL TELEVISION BROADCASTING, SATELLITE BROADCASTING, CABLE TV) ||
| | NETWORK | IP BROADCAST |
| | | OTHERS |

FIG. 6

| No | VIDEO NAVIGATION FUNCTION | INFORMATION DESCRIBED IN METADATA |
|---|---|---|
| 1 | HIGHLIGHT PLAYBACK | HIGHLIGHT PLAYBACK START TIME, HIGHLIGHT PLAYBACK DURATION, SYNCHRONIZATION ADD TIME, HIGHLIGHT SCENE RANKING, RECORDING TIME OF VIDEO CONTENTS, ADDRESS OF VIDEO CONTENT KEEPING SITE, VIDEO CONTENT TITLE, LIST OF ABBREVIATION TITLES |
| 2 | SCENE SEARCH | NAME OF ELEMENT CONSTITUTING VIDEO CONTENT, SCENE APPEARED TIME, SCENE DURATION, NAMES OF CHARACTERS IN A TARGET VIDEO CONTENT, APPEARED TIME, APPEARED DURATION, SYNCHRONIZATION ADD TIME, RECORDING TIME OF VIDEO CONTENTS, ADDRESS OF VIDEO CONTENT KEEPING SITE, VIDEO CONTENT TITLE, LISTS OF ABBREVIATION OF TITLES |
| 3 | RELEVANT INFORMATION RETRIEVAL | KEYWORD(S) CONTAINED IN A TARGET VIDEO, APPEARED TIME, SYNCHRONIZATION ADD TIME, KEYWORD ATTRIBUTE, KEYWORD RANK, RELEVANT INFORMATION ADDRESS, RECORDING TIME OF VIDEO CONTENTS, ADDRESS OF VIDEO CONTENT KEEPING SITE, VIDEO CONTENT TITLE, LIST OF ABBREVIATION OF TITLES |
| 4 | MESSAGE MANAGEMENT | MESSAGE, MESSAGE DISPLAY TIME, SYNCHRONIZATION ADD TIME, RECORDING TIME OF VIDEO CONTENTS, ADDRESS OF VIDEO CONTENT KEEPING SITE, VIDEO CONTENT TITLE, LIST OF ABBREVIATION OF TITLES, MESSAGE DISPLAY DURATION |
| 5 | SCENE COMMENT | ATTRIBUTES OF A PORTRAYED OBJECT, PORTRAYED LOCATION IN THE SCENE, PORTRAYAL START TIME, SYNCHRONIZATION ADD TIME, PORTRAYAL DURATION, RECOEDING TIME OF VIDEO CONTENTS, ADDRESS OF VIDEO CONTENT KEEPING SITE, VIDEO CONTENT TITLE, LIST OF ABBREVIATION OF TITLES |
| 6 | IMAGE CONTENTS SYNTHESIS BY SPECIFIC THEME | ADDRESS OF VIDEO CONTENT KEEPING SITE, PLAYBACK START TIME, PLAYBACK DURATION, THEME TITLE, RANK OF PLAYBACK TITLES ON PLAY LIST |
| 7 | RULE BASE FUNCTION CONTROL | ALL KINDS OF RULES (EXTERNAL EQUIPMENT CONTROL, CHARGING, CONNECTION OF PLURAL FUNCTIONS, etc.) |

FIG. 7

| No | ADAPTATION CONDITION | INFORMATION DESCRIBED IN METADATA |
|---|---|---|
| 1 | TERMINAL ADAPTATION | INTERFACE SPECIFICATION, SCREEN CONFIGRATION, SUPER-RESOLUTION PROSESSING, ENCODER SPECIFICATION, DECODER SPECIFICATION, APPLICATION SPECIFICATION, etc. |
| 2 | USER ADAPTATION | PROFILE, SCHEDULE, PERSONAL PREFERENCE, SITUATIONS, etc. |

FIG. 8

```
⟨ATTRIBUTES OF VIDEO CONTENT
    TITLE OF VIDEO CONTENT="○×WORLD SOCCER COMPETITION"
    RECORDING DURATION OF VIDEO CONTENT="2007.07.10"
    ADDRESS OF VIDEO CONTENT KEEPING SITE="0:¥contents"
    SYNCHRONIZATION ADD TIME="0:00:15"
⟨/ATTRIBUTES OF VIDEO CONTENT⟩

⟨LIST OF ABBREVIATION OF TITLES
                        ABBREVIATION="○×SOCCER" ABBREVIATION="○×WORLD COMPETITION"···⟩
⟨/LIST OF ABBREVIATION OF TITLES⟩

⟨HIGHLIGHT PLAYBACK⟩
    ⟨MENU TITLE         MENU ID="1" MENU ICON="ICON_ID_1"⟩
                        WATCHING IN 30 MIN "⟨/MENU TITLE⟩
    ⟨MENU TITLE         MENU ID="2" MENU ICON="ICON_ID_2"⟩
                        WATCHING IN 10 MIN "⟨/MENU TITLE⟩
    ⟨MENU TITLE         MENU ID="3" MENU ICON="ICON_ID_3"⟩
                        WATCHING IN 1 MIN "⟨/MENU TITLE⟩

⟨HIGHLIGHT SCENE    HIGHLIGHT PLAYBACK START TIME="00:00:10"HIGHLIGHT PLAYBACK DURATION="00:00:30"
                        RANK OF HIGHLIGHT SCENES="5"⟩⟨/HIGHLIGHT SCENES⟩
    ⟨HIGHLIGHT SCENE    HIGHLIGHT PLAYBACK START TIME="00:01:30"HIGHLIGHT PLAYBACK DURATION="00:01:55"
                        RANK OF HIGHLIGHT SCENES="3"⟩⟨/HIGHLIGHT SCENES⟩
                                    ⋮

⟨/HIGHLIGHT PLAYBACK⟩

⟨SCENE SEARCH⟩
    ⟨SCENE              APPEARD TIME="00:00:00"APPEARED DURATION="00:00:45"⟩
                        THE SCENE TITLE (e.g.:"OPENING")
    ⟨/SCENE⟩
    ⟨SCENE              APPEARD TIME="00:01:20"APPEARED DURATION="00:01:55"⟩
                        THE SCENE TITLE (e.g.:"FREE KICK FAILED")
    ⟨/SCENE⟩
    ⟨SCENE              APPEARD TIME="00:04:30"APPEARED DURATION="00:04:50"⟩
                        THE SCENE TITLE (e.g.:"OFFSIDE")
    ⟨/SCENE⟩                        ⋮

⟨/SCENE SEARCH⟩

⟨RELEVANT INFORMATION RETRIEVAL⟩
    ⟨RELEVANT INFORMATION   APPEARD TIME="00:00:00" KEYWORD ATTRIBUTE="SOCCER"
                            RELEVANT INFORAMATION ADDRESS="http//www.abcd.co.jp"
                            RANK OF KEYWORD="3"⟩
                            KEYWORD INCLUDED IN VIDEO CONTENT(e.g.:"OPENING")
    ⟨/RELEVANT INFORMATION⟩
    ⟨RELEVANT INFORMATION   APPEARD TIME="00:38:00" KEYWORD ATTRIBUTE="SOCCER"
                            RELEVANT INFORAMATION ADDRESS="http//www.efgh.co.jp"
                            RANK OF KEYWORD="5"⟩
                            KEYWORD INCLUDED IN VIDEO CONTENT(e.g.:"RED CARD")
    ⟨/RELEVANT INFORMATION⟩         ⋮

⟨/RELEVANT INFORMATION RETRIEVAL⟩
```

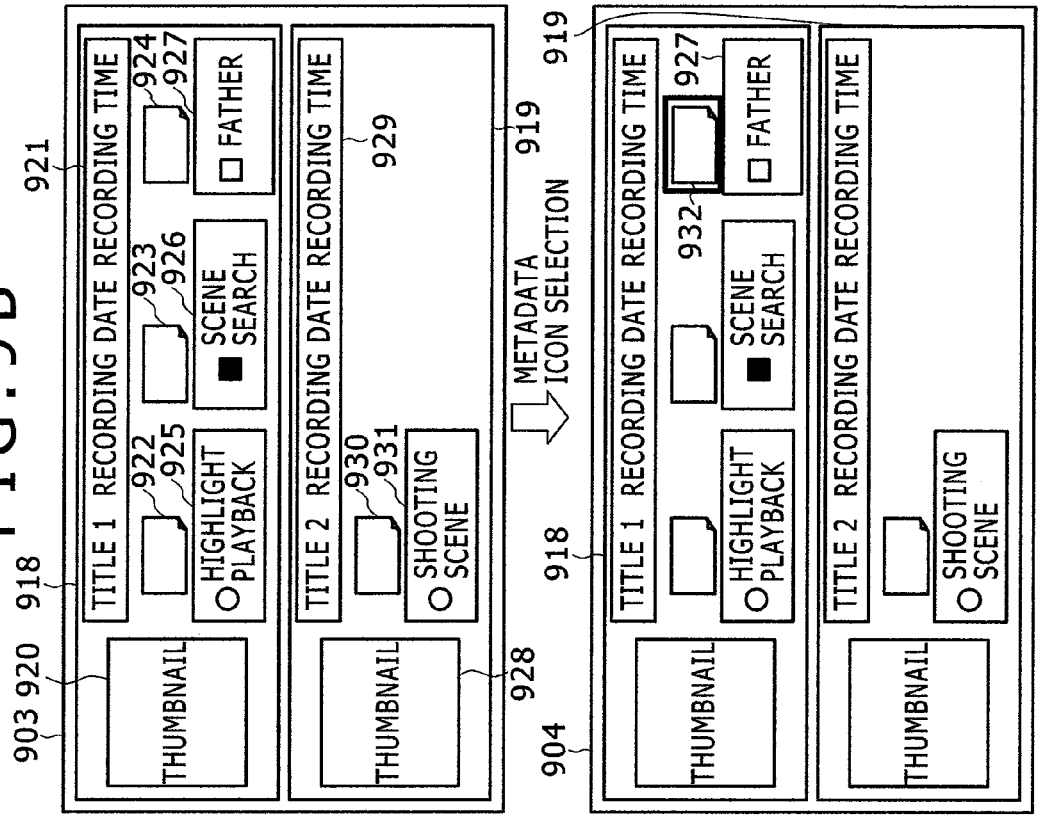
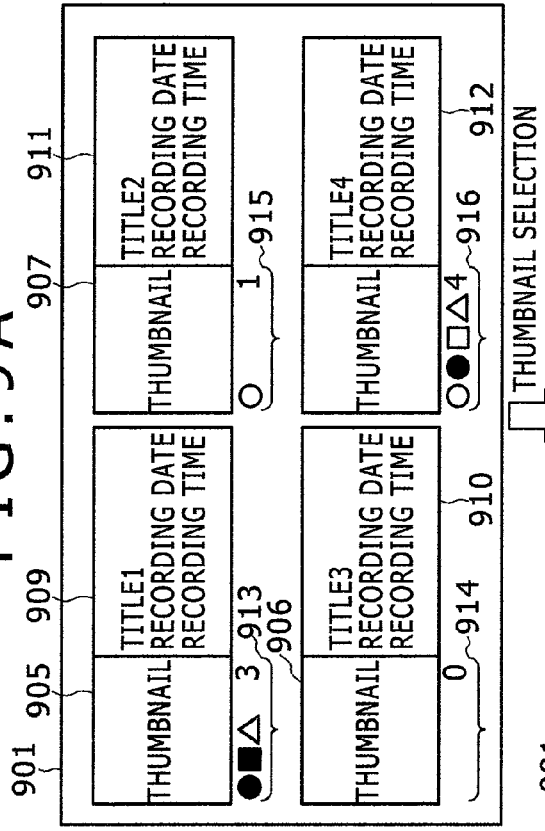

FIG.10

| SELECTING LOCATION OF VIDEO CONTENTS ||||| 
|---|---|---|---|---|
| HOME | HARD DISK DRIVE BUILT IN TERMINAL || RECOEDING TITLE LIST ||
| | HOME NETWORK CONNECTION APPARATUS | RECOEDER | RECOEDING TITLE LIST ||
| | | PC | ||
| | | OTHER STORAGE DEVICES | ||
| | OTHER APPARATUSES CONNECTED TO HOME NETWORK | VIDEO CAMERA | LOCATION LIST | RECORDING TITLE LIST |
| | | OPTICAL DISK | | |
| | | VIDEO TAPE | | |
| | | REMOVABLE DISK | | |
| OUTSIDE | BROADCASTING | GROUND WAVE BROADCASTING | ELECTRONIC PROGRAM TABLE ||
| | | SATELLITE BROADCASTING | ||
| | | CABLE TV | ||
| | NET | IP BROADCASTING | IP ADDRESS OF BROADCAST SITE | PROGRAM TABLE |
| | | OTHERS | | |

FIG. 11

| SELECTING IMAGE NAVIGATION FUNCTION (MULTIPLE SELECTION) | | |
|---|---|---|
| WATCH A TV PROGRAM | WATCH AN ON-AIR PROGRAM | SELECT CHANNEL |
| | WATCH A RECORDED PROGRAM | PLAY, PULSE, STOP, FAST FORWARD, REWIND, etc. |
| PLAY HIGHLIGHT IN A VIDEO CONTENT | | DESIGNATE PLAYBACK DULATION FOR HIGHLIGHT |
| SEARCH A SCENE IN A VIDEO CONTENT | | DESIGNATE KEYWORD, DESIGNATE NAME OF ELEMENT CONSTITUTING A VIDEO CONTENT |
| RETRIEVE INFORMATION RELEVANT TO VIDEO CONTENT | | DESIGNATE KEYWORD |
| INPUT A MESSAGE | | DESIGNATE A DESTINATION, DESIGNATE INSERTION SITE, INPUT A MESSAGE (TEXT, AUDIO, VIDEO) |
| MAKE COMMENTARY | | DESIGNATE A DESTINATION, DESIGNATE INSERTION SITE, FREE COMMENTARY, TEXT INSERTION |
| SELECT A THEME AND INTEGRATE | | DESIGNATE A THEME (DESIGNATE A THEME TITLE, DESIGNATE A PLAY LIST SYNTHESIS SEQUENCE), SELECT A PLAY LIST |

VIDEO CONTENT VIEWING APPARATUS

CLAIM OF PRIORITY

The present application claims priority from Japanese patent application JP2007-276346 filed on Oct. 24, 2007, the content of which is hereby incorporated by reference into this application.

BACKGROUND OF THE INVENTION (1) Field of the Invention

The present invention relates to a video content viewing apparatus using metadata to achieve all kinds of functions for users to watch video contents.

(2) Description of the Related Art

Most TV sets nowadays not only allow viewers to watch broadcast programs, but also enable the viewers to extract (or search) important scenes from a program or to search for a wanted program according to a keyword they inputted. There have been the following suggestions regarding the technique.

Japanese Patent Application Publication No. 2006-165650 relates to the management of collateral information (metadata), which is achieved by adding an item that shows whether each item in the metadata of each content is corrected, so as to indicate a contrivance for decision of correction propriety of metadata of contents and to manage each of various items in the metadata of the contents on an item-to-item basis.

Japanese Patent Application Publication No. 2002-152692 relates to a technique for obtaining information on a product associated with a broadcast program. According to the disclosed technique, a website address on the Internet of an advertiser who supplies product(s) or service(s) that viewers might be interested in when watching a broadcast program is transmitted as associated information simultaneously with a broadcast, so the viewers can easily obtain information associated with any subject in which they are interested.

Japanese Patent Application Publication No. 2003-158726 relates to a technique for providing information associated with a broadcast program using the Internet. According to the disclosed technique, viewers receive information for specifying a service area along with the channel number and the date of broadcast, so they can easily acquire the information relevant to a broadcast program independent of the service area.

SUMMARY OF THE INVENTION

TV sets today are required to be able to provide video contents that include broadcast programs and relevant information to a viewer in one of various forms selected according to the view preferences. Hereinafter, this function will be referred to as a "video navigation function". Both regular and special functions have been suggested for the video navigation function, which include regular forms like "Watch an On-air program" or "Watch a recorded program", and special forms like "Play back highlight in a video content", "Search a scene in a video content", "Search for information relevant to video content", etc., yet new functions are expected to be added in the future. For example, if video contents can be presented by a theme designated by a viewer, it would offer even more improved convenience of use.

To implement the video navigation function, it is necessary to set descriptions of conditions for executing different functions for each video content as a target (the description is called "metadata"). For instance, metadata for the highlight playback function requires location (time information) of a highlight scene of interest in each program. Preferably, metadata on a target content is kept in a TV set that has the video navigation function or in a recording device that records video contents. However, with a multifunction trend in the video navigation function and an increasing demand for target contents, a huge amount of metadata is also required. In that case, making and retaining such a huge amount of data only on the side of a viewing apparatus (TV set) could be a heavy load on the hardware configuration of the terminal, memory capacity, and processing power of a processor, for example, and this problem could lead to an increase in development costs of terminal devices. Therefore, there is a need to establish a new system to efficiently achieve the video navigation function.

Meanwhile, deterioration in quality is another concern that comes along with the increased amount of metadata because the video navigation function cannot be executed properly unless optimum metadata is acquired. Thus, a special function for verifying completeness of metadata and for correcting an incomplete portion is needed.

None of the aforementioned patent documents considers ways to manage and operate metadata in diverse forms of a video content.

It is, therefore, an object of the present invention to achieve a multifunction video navigation display without adding an extra load onto the hardware or software of a viewing apparatus.

In accordance with an aspect of the present invention, there is provided a video content viewing apparatus that executes all kinds of viewing functions (video navigation functions), including: a memory unit for acquiring video contents together with metadata to execute a video navigation function from an external device and storing them; a metadata analysis unit for selecting a video navigation function and for analyzing the acquired metadata; and a navigation unit for executing the selected video navigation function according to an analysis result provided from the metadata analysis unit.

In an exemplary embodiment of the present invention, the metadata analysis unit includes: a video navigation function selection section which allows a user to select a video navigation function; and a metadata verification unit for verifying completeness of the metadata based on a metadata description rule and for correcting and complementing an incomplete portion of the metadata.

In an exemplary embodiment of the present invention, as one of the video navigation function, the navigation unit has a function of viewing a video content relevant to a specific theme being designated, and the metadata analysis unit includes a metadata synthesis unit for collecting metadata relevant to a specific theme to synthesize new metadata associated with the theme.

In accordance with the present invention, a multifunction video navigation display can be achieved without adding an extra load onto the hardware or software of a viewing apparatus. At this time, even if metadata for executing the function is incomplete, it can be complemented to realize the normal video navigation function.

BRIEF DESCRIPTION OF THE DRAWINGS

These and other features, objects and advantages of the present invention will become more apparent from the following detailed description when taken in conjunction with the accompanying drawings, wherein:

FIG. 5 illustrates a table of locations of metadata and video contents;

FIG. 6 illustrates a table of video navigation functions and metadata description information;

FIG. 7 illustrates a table of metadata description information by adaptation condition;

FIG. 8 illustrates an implementation example of a metadata description method;

FIGS. 9A and 9B illustrate one example of a menu structure for the operation screen offered to a user;

FIG. 10 illustrates one example of a menu structure used for selecting location of a video content;

FIG. 11 illustrates a table of specific select menus for each video navigation function;

DETAILED DESCRIPTION OF THE PREFERRED EMBODIMENTS

Reference will now be made in detail to the preferred embodiments of the present invention, examples of which are illustrated in the accompanying drawings. While the following explains cases where the present invention is applied to AV equipment such as a TV set which displays and outputs video contents including broadcast programs or movies, the present invention is not limited thereto and can widely be applied to video content viewing apparatuses.

Figure 1:
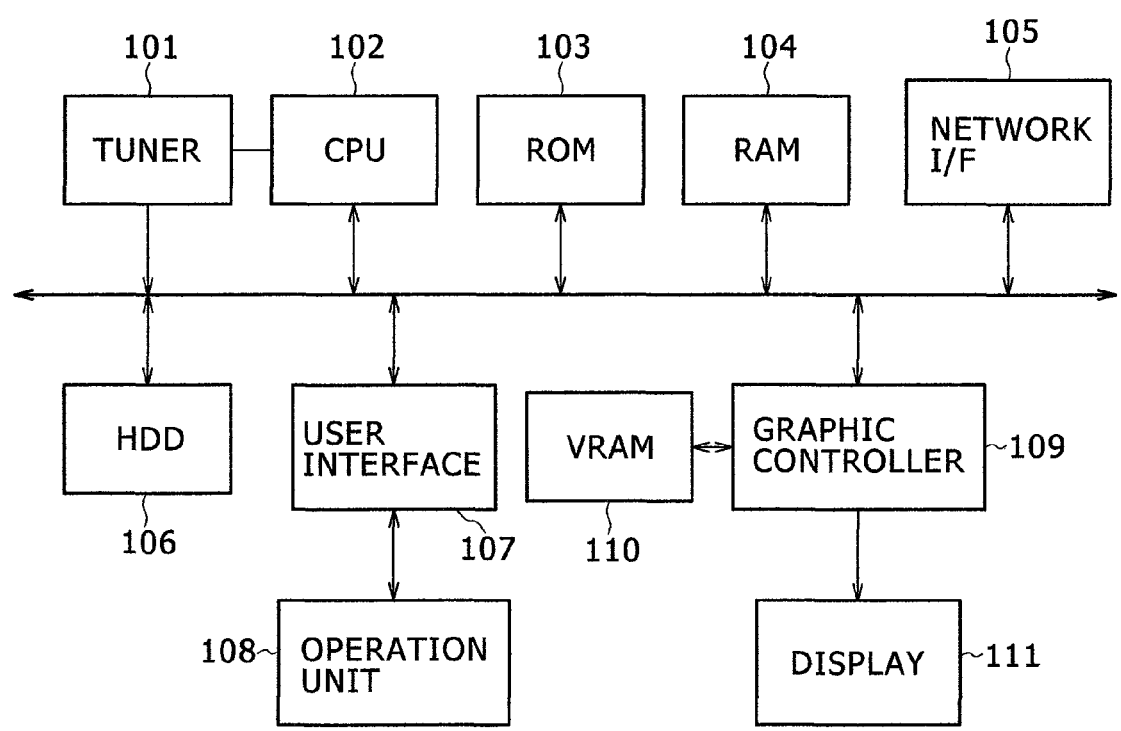
FIG. 1 is a schematic view illustrating one embodiment of a video content viewing apparatus in accordance with the present invention.

FIG. 1 is a schematic view of hardware illustrating one embodiment of a video content viewing apparatus in accordance with the present invention. Although a TV set is used to represent a video content viewing apparatus 100, other devices like a personal computer having TV functions can also be a target.

A tuner 101 receives a broadcast program (video content), and a demultiplexer (DeMUX) or a decoder decodes a received signal. The received video content is displayed on a display 111 and stored up, if necessary, in a large capacity memory unit, such as, a hard disk drive (HDD) 106. A CPU 102 controls the generation operation of an apparatus, and is involved in the operational management of metadata and the execution of a video navigation function. A ROM 103 and a RAM 104 store a program to execute a video navigation function in the CPU 102. A memory unit such as RAM 104 may take the form of a semiconductor memory or a removable memory such as a memory card, or can be shared with a memory like the HDD 106.

A network interface 105 provides an access to external Internet sites. For example, an analog modem for use with an analog phone line, an ISDN modem, an ADSL router or modem, a LAN adapter, a cordless phone adapter, or a wireless communication adapter such as Bluetooth can be utilized as the network interface.

A VRAM 110 retains video data, and a graphic controller 109 exerts display control over video or all kinds of information. The display 111 displays portrayed video images under the control of the graphic controller 109. In detail, the display 111 displays a broadcast program which is transmitted from the tuner 101, a video content which is stored up in the HDD 106, and an input video signal from outside (e.g., a video player). In addition, the display 111 displays, under the control of the graphic controller 109, images on an Internet web page on one single screen at the same time, or overlappingly arranges text information such as keyword on the screen. Any display taking the form of a display device such as an LCD panel or a plasma display panel can be employed as the display 111 for the present invention. Here, the display 111 for displaying images can be built as an internal unit, but it can also be connected as an external unit.

An operation terminal 108 receives user inputs that are provided via all kinds of operation keys, operation buttons, etc., and a user interface controller 107 supplies the received operation data to the CPU 102.

Figure 2:
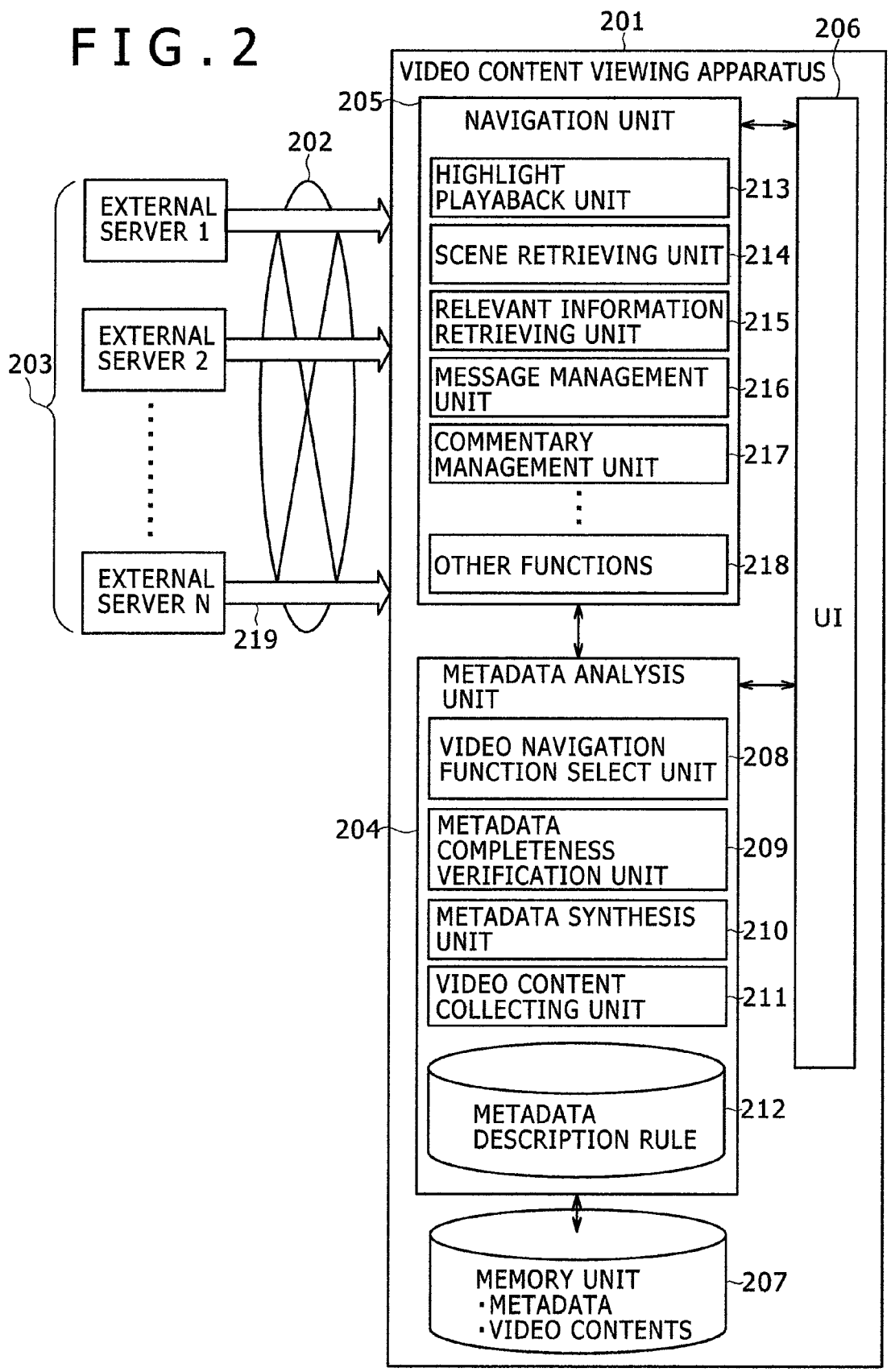
FIG. 2 illustrates a functional configuration of a metadata operation system.

FIG. 2 is a schematic view of a metadata operation system to which the video content viewing apparatus 100 of FIG. 1 is applied. The following description will mainly be focused on a functional configuration.

In the metadata operation system, a highlight playback function, a scene search function, or a relevant information search function is executed as part of the video navigation function, and data required for executing such functions is called "metadata". Metadata is a description of additional information on a video content.

Under the metadata operation system of this embodiment, a video content viewing apparatus 201 is not necessarily possessed of metadata in advance to achieve the video navigation function. Instead, metadata about each video content is established and managed by an external device such as an external server 203. If a user instructs the viewing apparatus 201 to execute a certain navigation function, the corresponding external server 203 transmits relevant metadata through a network 202, and the viewing apparatus 201 having acquired such data executes the desired function by the user. As noted above, instead of taking a storage space in the viewing apparatus, metadata can be distributed and stored in an external server and then provided to the terminal if necessary.

The video content viewing apparatus 201 is constituted by a metadata analysis unit 204, a navigation unit 205, a memory unit 207, and a user interface 206. The metadata analysis unit 204 has a function of analyzing metadata that is acquired and verifying its completeness, and a function of synthesizing new metadata based on metadata and video contents relevant to a specific theme that are collected. The navigation unit 205 executes video navigation function(s) according to an analysis result that is provided from the metadata analysis unit 204. The memory unit 207 stores video contents and metadata that are acquired or created. The user interface 206 presents an operation screen to a user and receives directional output from the user manipulation.

Some units discussed above have additional functions as follows.

The metadata analysis unit 204 includes a video navigation function selection unit 208 for allowing the user to select a desired video navigation function, a metadata verification unit 209 for verifying the completeness of metadata with reference to a metadata description rule 212 and for correcting, integrating and exchanging an incomplete portion, a metadata synthesis unit 210 for collecting metadata and video contents relevant to a designated theme to synthesize new metadata, and a video contents collection unit 211.

The navigation unit 205 is for executing all kinds of video navigation function as noted earlier. To this end, it includes a highlight playback unit 213 for playing a highlight scene in a video content, an information search unit 215 for searching for information relevant to a video content, a message management unit 216 for attaching a message to a scene (a video fraction of a fragment including motion data on a video, which includes continuous frames) or to an image (a still image information without motion data, which includes single or continuous frame(s)) in a video content and presenting it to an individual or many viewers who have a video content viewing apparatus, a comment management unit 217 for attaching a supplement explanatory drawing for example to a scene or an image included in a video content and presenting it to an individual or many viewers who have a video content viewing apparatus, and other functional sections 218.

To adapt the metadata operation system to the video content viewing apparatus of FIG. 1, the metadata analysis unit 204 and the navigation unit 205 are stored in a program format on the ROM 103 or the RAM 104 in FIG. 1, and the memory unit 207 is stored in a data format on the HDD 106. The user interface 206 provides an operation screen on the display 111 using the graphic controller 109 of FIG. 1, and receives directional output from the user manipulation from the operation terminal 108 through the user interface controller 107.

In accordance with the above-described configuration of this embodiment, it becomes easier to execute any video navigation function set by a user, with reference to metadata. The user may download metadata from the Internet, etc., and enjoy diverse information through a variety of video navigation functions, or may enjoy the video navigation function by video content genre.

Since the system of the present invention is designed to have an external server, for example, establish and manage metadata, the video content viewing apparatus can execute video navigation functions with a minimum level of transformation in the hardware configuration. In general, the metadata establishment process is accompanied with software processing such as animation processing or audio information processing, but these are also done by external equipment. Consequently, the load on the processor capability or the memory capacity of the video content viewing apparatus is reduced to cut down on development costs.

Figure 3:
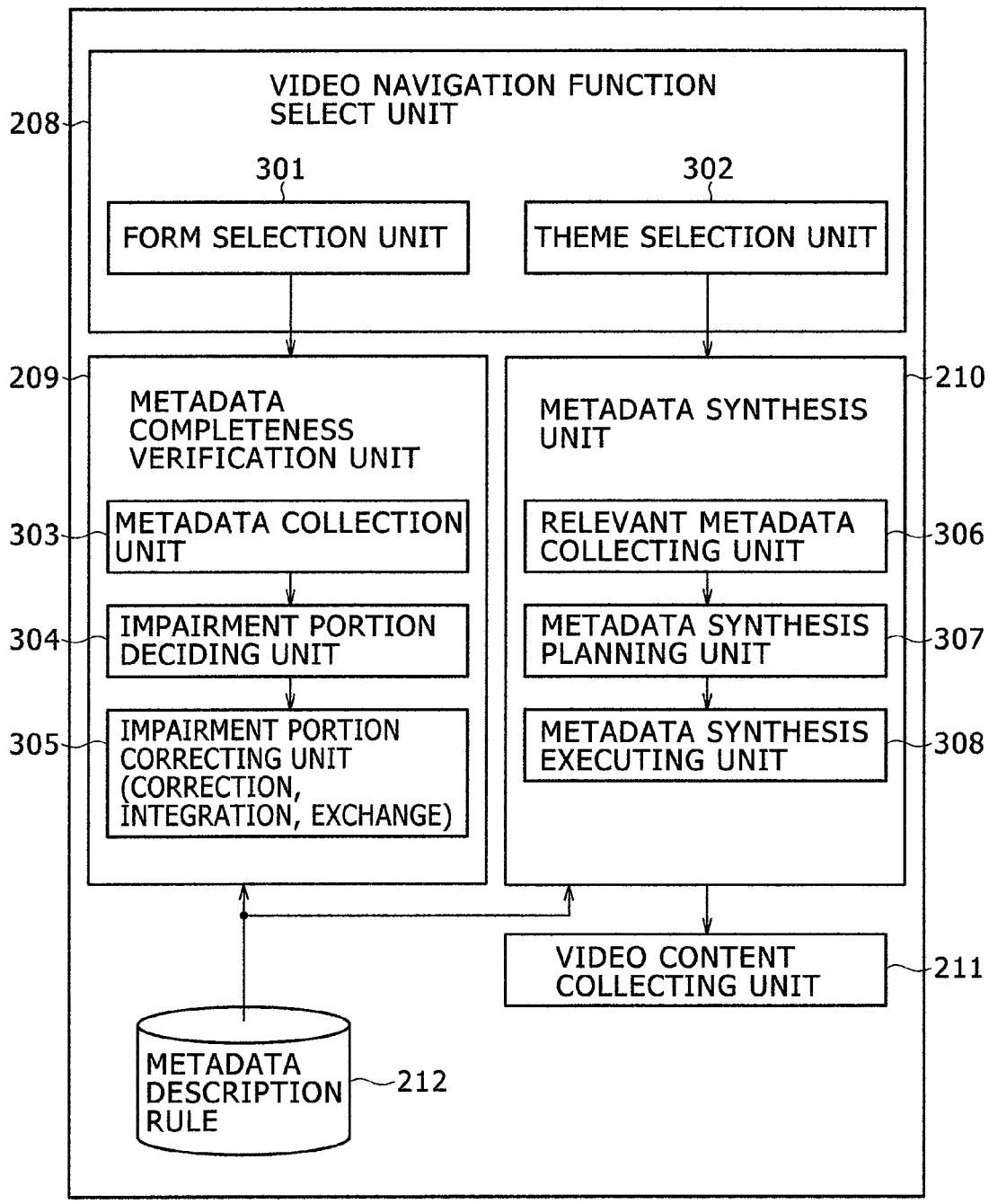
FIG. 3 is a detailed schematic view of a metadata analysis unit 204.

FIG. 3 is a detailed schematic view of the metadata analysis unit 204.

The video navigation function selection unit 208 includes a form selection unit 301 for allowing the user to select a desired video navigation function and a desired video content, and a theme selection unit 302 for allowing the user to select a specific theme.

The metadata verification unit 209 includes a metadata collection unit 303 for collecting metadata according to output information from the form selection unit 301, an impairment portion deciding unit 304 for deciding an incomplete portion through the verification of completeness of the collected metadata based on the metadata description rule 212, and an impairment portion correcting unit 305 for correcting, integrating and exchanging an incomplete portion.

The metadata synthesis unit 210 includes a relevant metadata collection unit 306 for collecting metadata that is relevant to a designated theme selected by the theme selection unit 302, a metadata synthesis planning unit 307 for extracting a necessary portion from the collected plural metadata and determining an ordering to synthesize metadata with a user-designated index such as a broadcast schedule, and a metadata synthesis executing unit 308 for synthesizing metadata according to the ordering provided from the metadata synthesis planning unit 307.

The video contents collection unit 211 collects associated video contents with reference to the synthesized metadata.

As described in FIG. 2, the memory unit 207 acquires metadata 219 containing a description associated with each video navigation function from a network connection apparatus, such as the external server 203, through the network 202 and stores the acquired metadata. The memory unit 207 can also collect video contents from a network connection apparatus. In the case of downloading video contents from a network, user authentication is carried out conforming to a well-known procedure at the request from an information transmission server.

Figure 4:
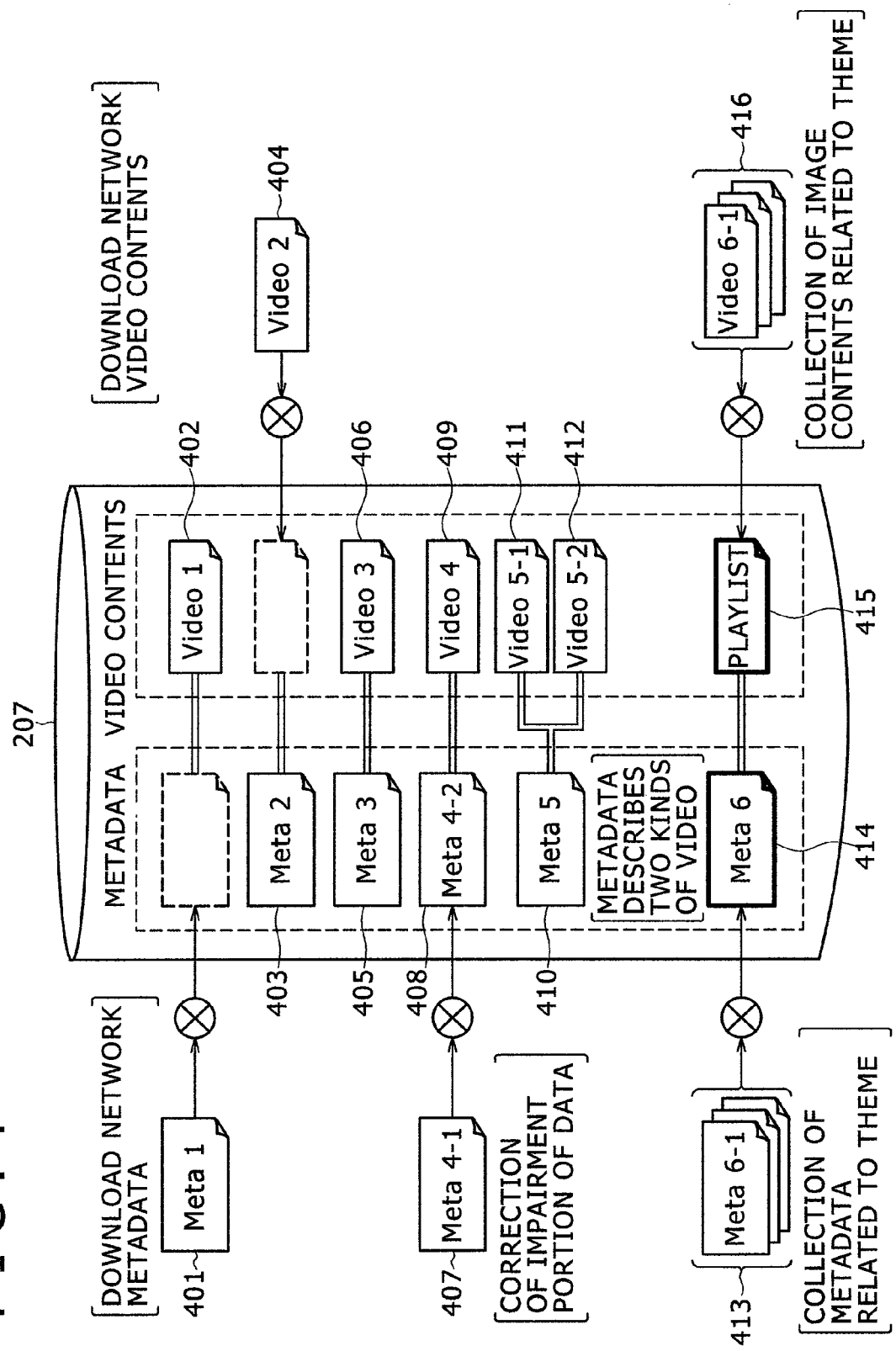
FIG. 4 illustrates the explanation of how a memory unit 207 acquires metadata and video contents.

FIG. 4 illustrates the explanation of how the memory unit 207 acquires metadata and video contents. The metadata analysis unit 204 verifies the completeness of the video contents and metadata stored in the memory unit 207. If there is no data which is required for a user-designated video navigation function, more video contents or metadata of interest are collected from a network, for example.

In this embodiment, it is assumed that there is no metadata 401 associated with a video content 402 in an initial state. Thus, associated metadata 401 is downloaded from a network connection apparatus such as an external server 203. Moreover, if there is no video content 404 associated with a metadata 403, an associated video content 404 is downloaded from a network connection apparatus. In this way, metadata 405 and video contents 406 are acquired and stored in one-to-one correspondence.

Meanwhile, there are some cases where a description for the metadata 408 associated with the video content 409 is incomplete. In that case, a metadata 407 that can be used for complementing the incomplete portion should be downloaded from a network connection apparatus. In other cases, metadata 410 may correspond to plural video contents 411 and 412, such as recording a multi-view sport broadcasting.

Moreover, in the case where a theme is given and metadata relevant to the theme is to be collected, a group of metadata 413 is downloaded from a network connection apparatus to synthesize new metadata 414, and a group of video contents 416 associated with the metadata 414 is downloaded from a network connection apparatus to create a play list 415.

In accordance with this embodiment, the completeness of the acquired metadata and video contents can be verified to restore to usable complete data, so it is possible to enjoy the video navigation functions even when incomplete metadata is acquired.

New metadata can be produced by extracting necessary portions from plural metadata pieces and synthesizing them. Thus, information is extracted from plural groups of metadata and recorded contents according to a specific theme designated by a user and a play list is created accordingly, such that the user may enjoy a video of his or her choice.

FIG. 5 illustrates a table of locations of metadata and video contents. Note that a device described hereinafter refers to any device that may be used by accessing a network or by connecting directly to a viewing apparatus.

For inside the home, people can acquire metadata or video contents from a memory device such as a built-in hard disk drive of a video camera or a video content viewing apparatus, or from a storage medium such as an optical disk, a video tape or a removable disk, or from a home network connection apparatus. For outside the home, people can acquire metadata or video contents from TV broadcasts such as ground wave broadcasting, satellite broadcasting, cable TV and the like, or from IP broadcasts (broadcasts over the Internet protocol).

The following will now explain in detail about specific examples of video navigation functions and information to be described by metadata that are used for the functions.

FIG. 6 illustrates a table of video navigation functions and metadata description information.

Referring to the table, "Highlight playback" (No. 1) is a function of playing a highlight in a video content, and at least highlight playback start time, highlight playback duration, and ranking information to show the priority order of highlight scenes are described by metadata. In addition to these, information like recording time of video contents, address of a video content keeping site, a video content title, list of abbreviation of titles, and add time for synchronizing video content playback time with the highlight playback start time described by the metadata can also be included.

"Scene search" (No. 2) is a function of searching a scene from a video content, and at least name(s) of element(s) constituting a video content, element appeared time, name(s) of character(s) who show in a video content selected from a keyword that is extractable from captions (subtitles), telop, audio or electronic program table information associated with a scene, and character appeared duration are described by metadata. In addition to these, appeared duration of elements that constitute a video content, appeared duration of characters who show in a video content, recording time of a video content, address of a video content keeping site, a video content title, a list of abbreviation of titles, and add time for synchronizing video content play time with the appeared time described by the metadata can also be included.

"Relevant information search" (No. 3) is a function of searching for information that is relevant to a video content, and at least keyword(s) that can be extracted from captions (subtitles), telop, audio or electronic program table information associated with a scene, keyword appeared time, keyword attributes including genre information such as "politics", "economics", or "entertainment", and ranking information to represent priority of the keyword are described by metadata. In addition, keeping site of information that is relevant to a video content (i.e., relevant information address), recording time of a video content, address of a video content keeping site, a video content title, a list of abbreviation of titles, and add time for synchronizing video content play time with the keyword appeared time described by the metadata can also be included.

"Message management" (No. 4) is a function of attaching a message to a scene or an image included in a video content to present it to plural viewers who have a video content viewing apparatus, and at least the message and message display time are described by metadata. In addition, recording time of a video content, address of a video content keeping site, a video content title, a list of abbreviation of titles, message display duration, and add time for synchronizing video content play time with the message display time described by the metadata can also be included.

"Scene comment" (No. 5) is a function of attaching a supplement explanatory drawing to a scene or an image included in a video content to present it to an individual or many viewers who have a video content viewing apparatus, and at least attributes of a portrayed object that includes shape information such as straight line, circle (oval), or rectangle, distinction between dotted line and solid line, distinction between coloring and transparency, or color information, portrayed location of an object in the scene, portrayal start time, and portrayal duration are described by metadata. In addition, recording time of a video content, address of a video content keeping site, a video content title, a list of abbreviation of titles, and add time for synchronizing video content play time with the portrayal start time described by the metadata can also be included.

"Image contents synthesis by specific theme" (e.g., election for the House of Councilors) (No. 6) is a function of designating a specific theme, and at least address of a video content keeping site, play start time of a video content, and play duration are described by metadata. In addition, duration of a play list, a theme title, and ranking information on play title on the play list can also be included.

"Rule base function control" (No. 7) represents other functions which include a function of analyzing telop describing a present subscription site of a video content to print a subscription postcard with a printer accessory, a function of a charging method for a pay program (e.g., soap opera) that requests a viewer to pay from the second time view after the first free-of-charge view, and the like. These functions are achieved by functional control under the rules on the conditions and operations for actuating associated functions. Therefore, an expression of rules on the conditions and operations for actuating functions is described by metadata associated to those functions.

The above-described information that is described by metadata can automatically be collected and preserved by a video content viewing apparatus. One way of preservation is to integrate only attributes of a video into one file and store the file in separation from other metadata to execute video navigation functions such as the highlight playback function or the scene search function.

FIG. 7 illustrates a table of metadata description information by adaptation condition.

"Terminal adaptation" (No. 1) describes conditions for adapting a terminal as metadata, especially in the case where video content viewing apparatuses of different specifications are mounted with different metadata operation functions from each other. Examples of such information include communication protocol for downloading a video content or interface specifications associated with communication capacity for upload and download, screen configuration associated with differences between the TV screen and the mobile terminal, availability of efficacy of the super-resolution processing associated with the picture quality of video contents or the hardware configuration of a video content viewing apparatus, specifications of the encoder and the decoder associated with an encoding system of a video content, video navigation function specification to describe metadata, and so forth.

By the use of terminal adaptation conditions, it becomes possible to offer video navigation functions that are adapted either to the specification of a video content viewing apparatus or to the version of a metadata operation system.

"User adaptation" (No. 2) describes conditions for adapting a video content viewing apparatus based on user-specific information as metadata, especially in the case where different users use the same video content viewing apparatus. Examples of such information include user profile, individual schedule, personal preference, situations, etc.

By the use of user adaptation conditions, it becomes possible to offer video navigation functions that are adapted to different situations of individual users. For example, a user can make a scene showing his or her favorite sport team play first as a highlight before other scenes of sport program highlights, search a scene showing his or her favorite character first, search for relevant information in a field that is personally familiar to the user by high-level keyword (which has a very low appearance probability), or search for information in a field that is not personally familiar to the user by easy and plain keyword (which has a very high appearance probability).

FIG. 8 illustrates an implementation example of a metadata description method.

This description example shows metadata associated with a video content from OX World Soccer Competition that was recorded on Jul. 10, 2007, which contains a description of metadata for executing the highlight playback function, the scene search function, and the relevant information search function. In the description format as shown in FIG. 8, data is inserted between the start tag <Element name> and the end tag </Element name> is defined as an element of metadata, and attributes of elements are described within a tag <Element name Attribute name="Attribute value" . . . >.

For the attributes of a video content, "Title of video content", "Recording time of video content", "Address of video content keeping site", and "Synchronization add time", and, also, abbreviation of titles is described. By including the abbreviation of titles, even if a user may input an abbreviation form of the title of a desired video content, metadata can still be specified.

The following will now describe metadata for executing each navigation function.

In the highlight playback function, definition of a menu for designating play time of a highlight is described first. Next, for the highlight scene, highlight playback start time, highlight playback duration, and ranking of highlight scenes are described in order of mention. There can be plural highlight scenes, and highlights are arranged in highest ranking order and played sequentially according to the user-designated highlight playback time.

In the scene search function, the element name of metadata is set to "Scene", and its attributes are described in order of "Appeared time" and "Appeared duration". And name(s) of element(s) constituting a video content or name(s) of character(s) showing in a video content are set as an element of metadata. There can be plural scenes, and a scene associated with the name of an element constituting a user-designated video content, or the name of a character showing in a user-designated video content is searched and displayed.

In the relevant information search function, the element name of metadata is set to "Relevant information", and its attributes are described under "Appeared time", "Keyword attributes", "Relevant information address", and "Keyword ranking" in order of mention. Keywords included in a video content are set as elements of metadata. There can be plural scenes, and relevant information synchronous with the playback time of a video content is searched from the Internet and is displayed for the user.

The following will now explain about the operation screen for allowing the user to select a video navigation function and its use method.

There are three methods for the user to select a video navigation function: (1) selecting a video content first and then selecting a video navigation function; (2) selecting metadata first and then selecting a video navigation function; and (3) designating a specific theme, extracting a video content based on the theme, and selecting a video navigation function from there.

FIGS. 9A and 9B illustrate one example of a menu structure for the operation screen which is offered to a user by the user interface 206.

FIG. 9A indicates a case where the user selects a desired video content first. In this case, a video content list interface screen 901 is provided first, followed by a video navigation function select screen 902 that pops out from the first screen.

The screen 901 displays thumbnails 905, 906, 907, and 908 and attribute information items 909, 910, 911, and 912 including title, recording date, recording time, etc., for four video contents, respectively. In addition, video navigation functions that can be executed for the sake of each of video contents are indicated by a group of marks 913, 914, 915, and 916. Here, "○" denotes the highlight playback function, "●" denotes the relevant information display function, "□" denotes the message input function, "Δ" denotes the commentary function, and "■" denotes the scene search function. Further, the number next to the mark group indicates a counting number of marks.

For example, when a user selects the thumbnail 908 on the screen 901, the operation screen shifts (or moves) to the screen 902. On the screen 902, the selected thumbnail 908 is highlighted (shown as a bold borderline), and a video navigation function select menu 917 appears. The function select menu 917 shows itemized video navigation functions corresponding to each mark in the mark group 916. For instance, when the user selects the "○ Highlight playback" item, the highlight playback function is executed.

Next, FIG. 9B indicates a case where the user selects metadata first, so the screen shows the metadata select screen 903 and a screen 904 that pops out from the first screen after the user selects one metadata.

The screen 903 is provided with metadata display areas 918 and 919 for two video contents, respectively. The metadata display area 918 displays a thumbnail 920 associated with a video content, attribute information 921 including title, recording date, recording time, etc., of a video content, metadata icons 922, 923, 924, and marks 925, 926, and 927 each of which indicates a video navigation function that can be executed. Each mark has the same definition as discussed earlier. The metadata icons 922, 923, and 924 are associated with the video navigation functions 925, 926, and 927, respectively. The metadata display area 919 is also displayed in similar manner. However, the metadata display area 919 displays only one metadata icon 930 and one mark 931 representing a video navigation function.

For example, when a user selects the metadata icon 924 on the screen 903, the operation screen shifts (or moves) to the screen 904. On the screen 904, the selected icon 924 is highlighted (shown as a bold borderline) similar to the icon 932, and the "Message input" function 927, e.g., sending a message to father, can be executed.

The menu structure in FIGS. 9A and 9B displays only menu items of upper layers that fit within the size of the screen. However, if necessary, each menu can also display more specific menu items of lower layers. This is now explained below.

FIG. 10 illustrates one example of a menu structure used for selecting location of a video content.

If a target video content is stored in a memory device (e.g., hard disk drive) built in a video content viewing apparatus, a user selects the target video content in a list of recorded titles.

If a target content is stored in a home network connection apparatus such as a recorder, a personal computer or other storage equipment, the user first selects a proper device and then selects the target video in a list of recorded titles which is displayed when the user selects the device.

If a target video content is stored in a storage medium such as a video camera, an optical disk, a video tape, or a removable disk, the user first selects a proper device and then selects and downloads the target video content in a list of storage locations and a list of recorded titles which are displayed when the user selects the device.

If a target video content is acquired from broadcast contents, the user first selects a proper broadcast mode out of ground wave broadcasting, satellite broadcasting, and cable TV, and then schedules the target video content to be recorded at a desired time, the target video content being selected in a table of electronic programs that is displayed when the user selects the broadcast mode.

If a target video content is acquired from IP broadcasts, the user first selects the IP broadcasting method as a broadcast mode and then schedules the target video content to be recorded at a desired time, the target video content being selected with reference to the broadcast site address and in a table of electronic programs which are displayed as the user selects the IP broadcasting method as a broadcast mode.

Although not shown, it is also possible for the user to input the title of a target video content and search it directly.

FIG. 11 illustrates a table of specific select menus for each video navigation function. The video navigation functions display select menus as follows.

A basic function allows a user to watch a TV program or a recorded program thereof, and has select menus including channel select, fast forward, rewind and playback, etc.

In the case a user wants to play back a highlight in a video content, the user may set the highlight playback duration to 5 minutes, 10 minutes, etc., to watch it. At this time, if the highlight playback duration is different from the playback duration available for metadata, the select screen may change it to the playback duration that can be supported by metadata and displays such a menu.

In the case a user wants to search a scene in a video content, the user is provided with a screen for scene search. In detail, the screen displays a list of keywords which can be extracted from captions, telop, audio or electronic program information associated with the scene, or names of elements, e.g., a topic of a TV program, which constitute a video content, so that the user is able to select a desired scene from it.

In the case a user wants to search information relevant to a video content, the user is provided with a screen for the search of relevant information. In detail, the screen displays a list of keywords which can be extracted from captions, telop, audio or electronic program information associated with the scene, so that the user is able to select desired relevant information from it.

In the case a user wants to attach a message for a scene or an image included in a video content and to present it to an individual or many viewers who have a video content viewing apparatus, the user is provided with a message input screen. On the screen, the user designates a destination and a message insert site, and inputs a message in combination of text, audio, and video.

In the case a user wants to portray a comment such as a supplement explanatory drawing on a scene or an image included in a video content and to present it to one or plural viewers who have a video content viewing apparatus, the user is provided with a commentary input screen. On the screen, the user designates a destination and an insert site of the supplement explanatory drawing, and inserts free commentary and explanatory text.

In the case a user wants to watch a theme-specific video content, the user is asked to designate a specific theme and is provided with a play list thereof on the screen. On the screen in this case, the user designates a theme title and a play list synthesis ordering (i.e., whether video contents should be synthesized in order of recording time, or whether video contents should be synthesized in order of priority (ranking)). The thusly synthesized play list is displayed and the user selects it for watching.

In FIG. 11, the user can make selection of more than one item as long as it does not cause a functional conflict. If in any case a user-select video navigation function changes the meaning of the buttons on a remote controller, the new meanings of the buttons should be displayed on the screen.

In FIGS. 9A to 11, the menu item expression method is not limited to those examples described above. If the user can easily be reminded of the meaning of the menu items, the menu items may take the form of character row, icon, or thumbnail. If icons or thumbnails are put on the menu items (e.g., it is assumed that metadata associated with a video content is not available), a better list can be created by changing the color of the menu (area), for example. Also, the user can select a desired function at enhanced efficiency if a video navigation function or functions that can be executed with the selected metadata could be distinguished or highlighted.

The following will now explain a process flow of how to execute a video navigation function associated with a menu that is selected in each of the operation screens. To be short, the flow according to this embodiment involves two processes: one is for complementing incomplete metadata, and the other is for synthesizing metadata under the theme-specific watch function.

Figure 12:
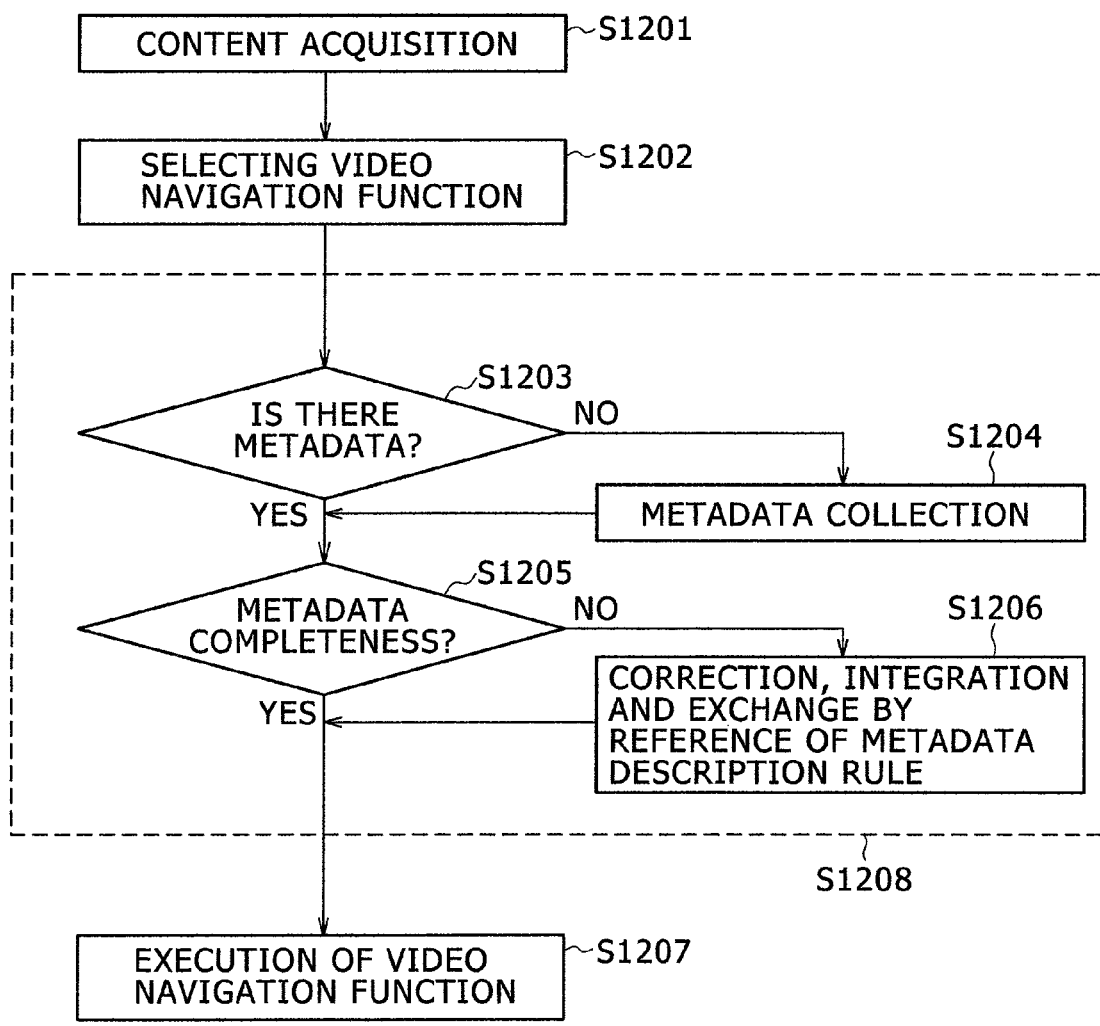
FIG. 12 is a flow chart describing the process of metadata collection and verification of metadata completeness.

FIG. 12 is a flow chart describing the process of metadata collection and verification of metadata completeness for a selected video navigation function. The process is achieved with the help of the form selection unit 301, the metadata verification unit 209, and the metadata description rule 212 shown in FIG. 3.

In step 1201, the form selection unit 301 selects a video content in the menu shown in FIGS. 9A and 9B or FIG. 10, and acquires it from the location shown in FIG. 10.

In step 1202, the form selection unit 301 selects a video navigation function in the menu shown in FIGS. 9A and 9B or FIG. 11.

In step 1208, the metadata verification unit 209 conducts the verification of metadata completeness. This includes the following steps 1203 to 1206.

In step 1203, it is decided whether metadata relevant to the video navigation function that is selected in step 1202 is stored in the memory unit 207. That is, any of the description information shown in FIG. 6 and FIG. 7 about the selected video navigation function is sufficient.

If it turned out in the decision step 1203 that such metadata is not stored, in step 1204, one or more metadata pieces relevant to the acquired video content are collected. The relevance between video content and metadata can be found out based on the title information given to the video content, for example.

In step 1205, completeness of the acquired metadata is verified based on the metadata description rule 212. The metadata description rule 212 describes for each video navigation function hierarchical relation and/or modification relation among tag information, and a list of tag information which provides data type attachable to the tag information and data select site under the category of video navigation function.

If it turned out in the decision step 1205 that the metadata is incomplete, in step 1206, an incomplete portion is corrected, integrated, and exchanged to be complete. If the incomplete portion is related to a typing error in a character row of tag information, the character row is corrected. If the hierarchical relation or the modification relation is wrong, the layer from which an error is detected and tag information in its lower layer are all deleted, and a corresponding portion is extracted from other metadata collected in step 1204 to be attached to the deleted position. If necessary tag information is missing or omitted, this missing portion is either exchanged with other metadata collected in step 1204, or complemented by a corresponding portion that is extracted from other metadata. Meanwhile, if plural metadata pieces collected in step 1204 are all complete but a duplicate portion is smaller than a predetermined threshold, those metadata pieces are integrated.

In step 1207, a video navigation function is executed with the complete metadata.

Figure 13:
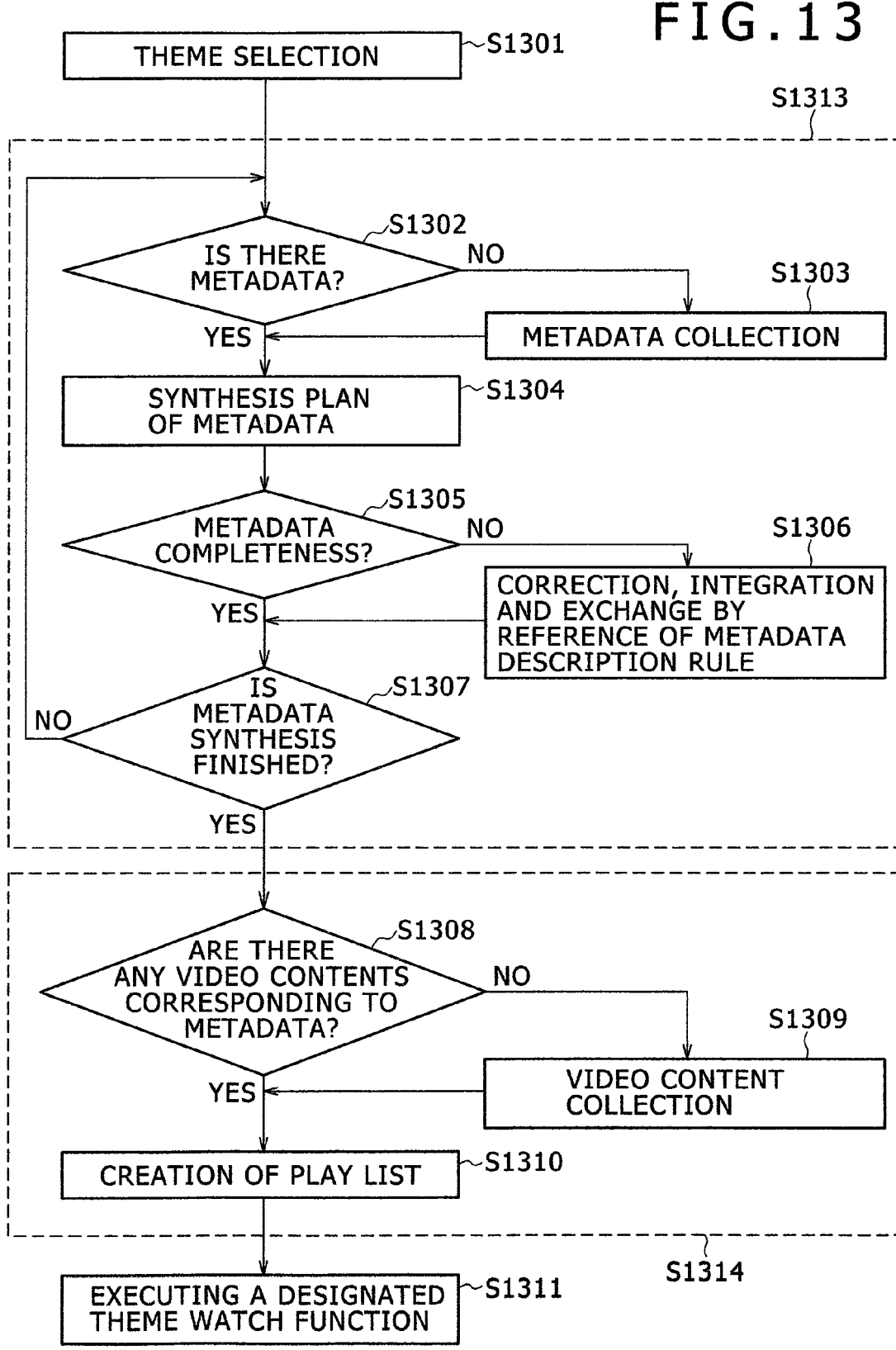
FIG. 13 is a flow chart describing the process of creating metadata relevant to a designated theme and a play list.

FIG. 13 is a flow chart describing the process of creating metadata relevant to a designated theme and a play list. This metadata is composed of information included in the theme under the "Image contents synthesis by specific theme" (No. 6) in FIG. 6. The process is achieved with the help of the theme selection unit 302, the metadata synthesis unit 210, the video contents collection unit 211, and the metadata description rule 212 shown in FIG. 3.

In step 1301, a theme is selected. Suppose that a theme has theme title and play list synthesis ordering information as its attribute information. The theme title can be selected in a list of keywords relevant to genre, or can be searched with a conventional search method in a pre-registered list of keywords that is prepared by inputting a keyword character row. The play list synthesis ordering information is composed of information concerning whether video contents should be synthesized in order of recording time or whether video contents should be synthesized in order of priority (ranking)), upper limit value of play duration of the play list, and other limits.

In step 1313, the metadata synthesis unit 210 synthesizes metadata. This includes the following steps 1302 to 1307.

In step 1302, it is decided whether metadata associated with the theme that is selected in step 1301 is stored in the memory unit 207. In this case, any of the description information associated with the scene search (No. 2) or the search of relevant information (No. 3) in FIG. 6 among other information provided in FIG. 6 and FIG. 7 is sufficient.

If it turned out in the decision step 1302 that such metadata is not stored, in step 1303, a predetermined amount of metadata is collected from a site shown in FIG. 5 and is stored in the memory unit 207. By limiting the amount of the metadata to a small level, even though a huge amount of metadata could be found, it becomes possible to maintain the collecting amount of metadata and the time for searching metadata at proper levels.

In step 1304, a synthesis plan for metadata is set. The synthesis planning is achieved by extracting information included in the theme "Image contents synthesis by specific theme" (No. 6) in FIG. 6 from a selected-theme relevant metadata that is stored in the memory unit 207, and then synthesizing metadata according to the play list synthesis ordering information.

In step 1305, completeness of the synthesized metadata obtained in step 1304 is verified based on the metadata description rule 212.

If it turned out in the decision step 1305 that the metadata is incomplete, in step 1306, an incomplete portion is corrected, integrated, and exchanged to be complete. The process involved in this step 1306 is the same as the process that is carried out in step 1206 discussed before.

In step 1307, it is decided whether the synthesis of metadata is finished. This decision is made based on the play list synthesis ordering information. If it turned out in the decision step 1307 that the synthesis of metadata is not finished, the process flow returns to step 1302.

In step 1314, the video contents collection unit 211 collects relevant video contents. This includes the following steps 1308 to 1310.

In step 1308, it is decided if a video content associated with the metadata that is synthesized in step 1313 is stored in the memory unit 207.

If it turned out in the decision step 1308 that the video content is not stored, in step 1309, video contents are collected from a site shown in FIG. 5.

In step 1310, a play list is created with the synthesized metadata from step 1313 and the collected video contents from step 1309.

Lastly, in step 1311, a video navigation function ("Image contents synthesis by specific theme") is executed following the created play list.

As has been explained so far, in accordance with the present invention, a user-designated video navigation function can easily be executed based on metadata. Moreover, an associated video content viewing apparatus can achieve such performance with a minimum hardware configuration, without necessarily having an extra load upon the processor capability or the memory capacity.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A video navigation viewing apparatus that executes display functions that are video navigation functions concerning a video content, comprising:
    a user interface which displays information showing the video contents and information showing the plural video navigation functions which can be executed to the video contents, and allows a user to designate the video contents and the video navigation function executed to the video contents;
    a memory unit which acquires the video contents designated through the user interface together with metadata to execute video navigation functions from an external device and stores them;
    a metadata analysis unit which selects the video navigation function designated through the user interface and analyzes the acquired metadata; and
    a navigation unit which executes the selected video navigation function according to an analysis result provided from the metadata analysis unit
    wherein the metadata analysis unit stores a metadata description rule set for each of the plural video navigation functions in advance, and
    the metadata analysis unit includes a metadata verification unit which refers to the metadata description rule set for the selected video navigation function, verifies completeness of the metadata of the selected video navigation function based on the metadata description rule and corrects/complements an incomplete portion of the metadata,
    wherein the plural video navigation functions include highlight playback, scene search, relevant information retrieval, message management, scene comment, image contents synthesis by specific theme and rule base function control of the video contents, and the video navigation functions are designatable through the user interface.

2. The video navigation viewing apparatus according to claim 1, wherein the metadata analysis unit includes:
    a video navigation function selection section which allows a user to select a video navigation function.

3. The video navigation viewing apparatus according to claim 1, wherein, as one of the video navigation functions, the navigation unit has a function of displaying a video content relevant to a specific theme being designated, and wherein the metadata analysis unit includes a metadata synthesis unit which collects metadata relevant to a specific theme and synthesizes new metadata relevant to the theme.

4. The video navigation viewing apparatus according to claim 3, wherein, by the use of the metadata synthesis unit, the metadata analysis unit downloads the metadata relevant to a specific theme from an external device to synthesize new metadata, and downloads video contents associated with the synthesized metadata from an external device to create a play list relevant to the specific theme.

5. The video navigation viewing apparatus according to claim 1, wherein, as one of the video navigation functions, the navigation unit has a function of attaching a message to a scene or an image included in a video content to present it to other video content viewing apparatuses.

6. The video navigation viewing apparatus according to claim 1, wherein, as one of the video navigation functions, the navigation unit has a function of attaching a supplement explanatory drawing to a scene or an image included in a video content to present it to other video content viewing apparatuses.

7. The video navigation viewing apparatus according to claim 1, wherein, if the memory unit does not contain video contents associated with a selected video navigation function, the video contents are downloaded from an external device.

8. The video navigation viewing apparatus according to claim 1, wherein if description contents of metadata that are stored in the memory unit are incomplete, the metadata verification unit downloads suitable metadata for complementing an incomplete portion from an external device.

9. The video navigation viewing apparatus according to claim 1, wherein for each of the video navigation functions, the metadata description rule describes a hierarchical relation or modification relation among tag information that identifies metadata attributes, and a list of tag information which provides data type attachable to the tag information and data options.

10. The video navigation viewing apparatus according to claim 1, wherein the apparatus provides a menu screen for allowing a user to select a video navigation function, the screen displaying thumbnails to represent the video contents, attribute information of video contents, and marks to indicate video navigation functions to be executed, and wherein if a user selects a thumbnail of a desired content, the selected thumbnail is highlighted and a video navigation function select menu is displayed.

11. The video navigation viewing apparatus according to claim 1, wherein the apparatus provides a menu screen for allowing a user to select a video navigation function, the screen displaying thumbnails to represent video contents, attribute information of video contents, metadata icons, and marks to indicate video navigation functions associated with the metadata icons, and wherein if a user selects a metadata icon of a desired content, the selected icon is highlighted and a video navigation function associated with the metadata icon is executed.

12. The video navigation viewing apparatus according to claim 1, wherein the metadata describes information to execute each video navigation function, together with apparatus adaptation conditions for adaptation to specifications of an associated video content viewing apparatus or user adaptation conditions for adaptation to user differences or preferences.

* * * * *